United States Patent [19]

Swain

[11] Patent Number: 4,556,159
[45] Date of Patent: Dec. 3, 1985

[54] PROTECTIVE HOLDER FOR BINOCULARS

[76] Inventor: Dwight P. Swain, 420 Paso Robles Dr., Santa Barbara, Calif. 93108

[21] Appl. No.: 674,938
[22] Filed: Nov. 26, 1984
[51] Int. Cl.[4] .............................................. A45F 5/00
[52] U.S. Cl. .................................... 224/257; 224/269; 224/909
[58] Field of Search ............... 224/909, 908, 251, 257, 224/252, 269, 208, 209

[56] References Cited

U.S. PATENT DOCUMENTS

| | | | |
|---|---|---|---|
| 463,634 | 11/1891 | Lowthime | 224/909 X |
| 825,190 | 7/1906 | Comi . | |
| 2,990,089 | 6/1961 | Nystrom . | |
| 3,307,757 | 3/1967 | Gatos et al. | 224/909 X |
| 3,326,432 | 6/1967 | Banks et al. . | |
| 3,507,424 | 4/1970 | Burkins | 224/257 |
| 3,526,347 | 9/1970 | Kuban . | |
| 3,642,345 | 2/1972 | Akin, Jr. et al. . | |
| 3,910,470 | 10/1975 | Swenson et al. | 224/208 |
| 3,990,617 | 11/1976 | Carter | 224/251 |
| 4,069,955 | 1/1978 | Noyes | 224/208 X |
| 4,168,022 | 9/1979 | Brewer . | |
| 4,320,863 | 3/1982 | Lyer et al. . | |
| 4,327,960 | 5/1982 | Gould . | |
| 4,416,405 | 11/1983 | Caillouet . | |
| 4,461,411 | 7/1984 | Harrow | 224/908 X |

OTHER PUBLICATIONS

Velcro Product News, Apr. 1977, PN #32.
Strapet Info.

Primary Examiner—Stephen Marcus
Assistant Examiner—Robert Petrik
Attorney, Agent, or Firm—Norman B. Rainer

[57] ABSTRACT

A holder device of adjustable size is provided to hold neckstrap-suspended binoculars in a non-swinging manner in front of the user. The device is comprised of an elastomeric holding band adapted to form a closed loop that grips the binoculars.

Tensioning belts have terminal clips which attach to the apparel of the user are associated with the holding band in a manner to permit the binoculars to be drawn rearwardly toward the user. A removable lens cap affords protection for the upwardly directed eyepiece lenses of the binoculars.

7 Claims, 5 Drawing Figures

PROTECTIVE HOLDER FOR BINOCULARS

BACKGROUND OF THE INVENTION

This invention concerns a device for holding binoculars that are pendantly supported by a neck strap worn by the user, and more particularly relates to a holding device which maintains binoculars in a state of ready use while protected against outdoor environmental factors.

Outdoorsmen such as hunters, hikers and photographers generally carry a camera or binoculars to facilitate or enhance the purposes of their outdoor excursion. The camera or binoculars must be carried in a hands-free manner without interfering with other equipment or activities. The optical surfaces of the binoculars or camera equipment should be protected from rain and dust, and the equipment is preferably held in a manner permitting rapid utilization.

Currently available holders for binoculars and cameras generally utilize a supporting neck strap, and a harness strap which laterally traverses the back and chest of the user. Although effective in holding the camera or binoculars at waist or chest level and preventing bouncing or swinging movement thereof during walking and bending activities, the harness causes discomfort, especially with prolonged use. In certain disclosed embodiments of such holder devices, a Velcro fastener must be opened in order to functionally deploy the camera or binoculars. In the case of a hunter who requires use of his binoculars, the noise produced by the opening of the Velcro fastener can scare away the quarry.

It is accordingly an object of the present invention to provide a holder device for binoculars that are pendantly supported by a neck strap.

It is another object of this invention to provide a holder device of the foregoing object which positions the binoculars in front of the user in a manner facilitating rapid and noiseless deployment.

It is a further object of the present invention to provide a holder device of the aforesaid nature which prevents swinging movement of the binoculars.

It is still another object of the invention to provide a device of the aforesaid nature which protectively encloses the eyepiece surfaces of the binoculars.

The present invention has the still further object of providing an improved holder device of simple and rugged construction which may be economically manufacutred.

These objects and other objects and advantages of the invention will be apparent from the following description.

SUMMARY OF THE INVENTION

The above and other beneficial objects and advantages are accomplished in accordance with the present invention by a holder device comprising:
(a) an elongated elastomeric holding band having lateral extremities adapted to interengage to form a closed loop of variably sized perimeter having forwardly and rearwardly disposed portions,
(b) elastomeric tensioning means associated with said holding band at a site that becomes the forwardly disposed portion of said closed loop, said tensioning means having two flexible freely movable extremities adapted to apply a tensioning force directed substantially horizontally and rearwardly with respect to said closed loop,
(c) a jawed-type of releasable fastener associated with each extremity of said tensioning means, and
(d) lens protecting means attached by a flexible tether to said holding band.

In prefered embodiments of the device of this invention, the extremities of the holding band are provided with Velcro fastening means with facilitate adjustable interengagement to form a closed loop having a size adequate to snugly grip the intended binoculars in a plane perpendicular to the optical axes thereof. The lens protecting means is preferably a substantially integral cup-shaped structure of elongated design and fabricated of resilient material. The releasable fastener is preferably adapted to grip a fold of a fabric without damaging the fabric. The holding band and lens protecting means are preferably fabricated of fabric-backed closed cell neoprene foam sheet stock of the type generally utilized in fabricating diver's wet suits.

BRIEF DESCRIPTION OF THE DRAWING

For a fuller understanding of the nature and objects of the invention, reference should be had to the following detailed description taken in connection with the accompanying drawing forming a part of this specification and in which similar numberals of reference indicate corresponding parts in all the figures of the drawing.

Figure 1:
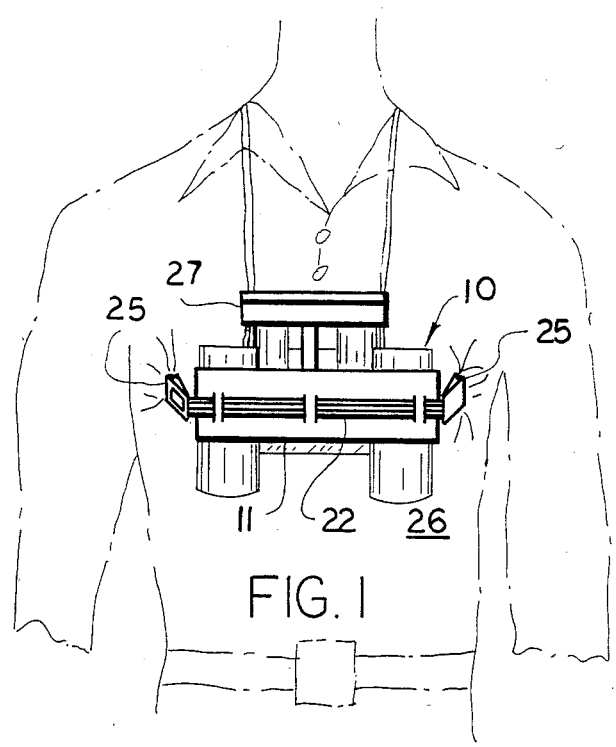
FIG. 1 is a front perspective view of the holder device in functional association with binoculars pendantly supported by a neck strap worn by the user.
Figure 2:
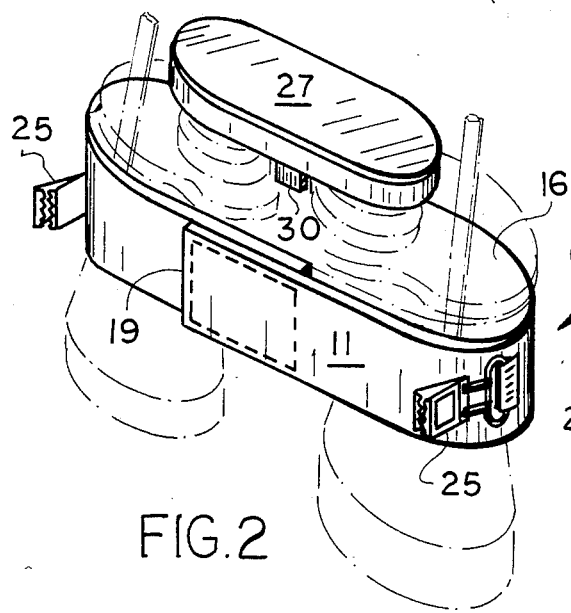
FIG. 2 is a rear perspective view of the holder device of FIG. 1.
Figure 3:
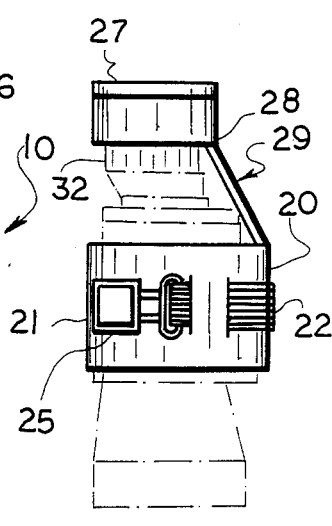
FIG. 3 is an end view of the holder device of FIG. 1.
Figure 4:
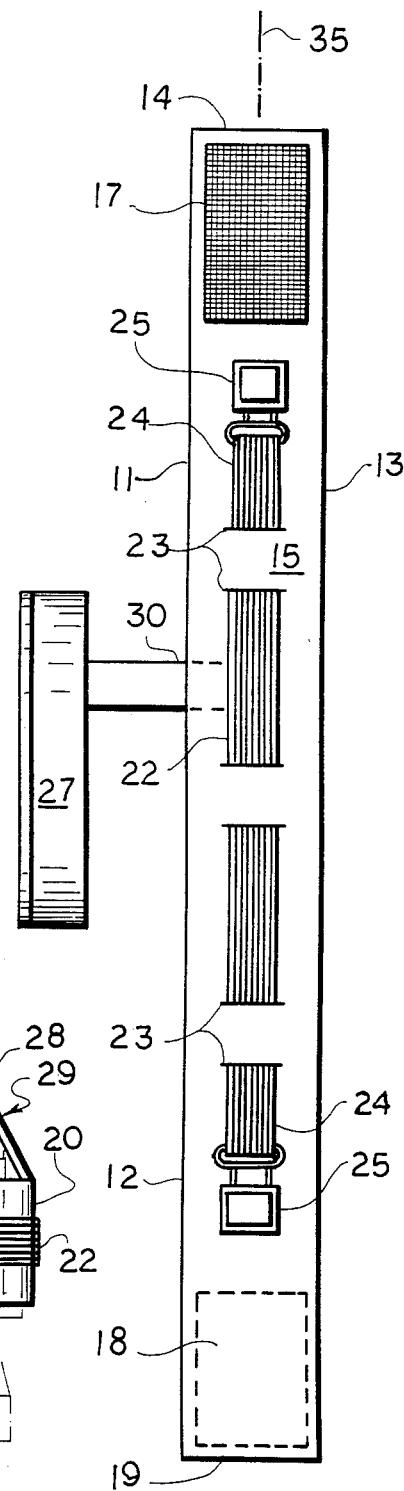
FIG. 4 is a side view of the holder device of FIG. 1 in its disengaged and flattened state.

For convenience in description, the terms "front" and "rear" or words of similar import will have reference to the right and left extremities, respectively, of the device appearing in FIG. 3. Similarly, the expressions "upper" and "lower" and equivalents thereof will have reference to the upper and lower extremities, respectively, of the holder device shown in FIG. 3.

DESCRIPTION OF THE PREFERRED EMBODIMENT

Referring to the drawing, an embodiment of the holder device 10 of the present invention is shown comprised of elongated elastomeric holding band 11 of rectangular configuration having parallel upper and lower long edges 12 and 13, respectively, short edges 14 and 19 defining lateral extremities in opposed disposition along the axis of elongation 35 of said holding band, outer surface 15, and interior surface 16. A first patch of Velcro binding material 17 is affixed to the outer surface of said holding band adjacent lateral extremity 14. A coordinatively interactive second patch of Velcro binding material 18 is affixed to the interior surface of said holding band adjacent lateral extremity 19. The manner of positioning of said Velcro patches is such that when the extremities are curled rearwardly and placed in abutment one above the other, the patches interengage to form a closed loop of variable sized perimeter.

In preferred embodiments, the holding band will have a height measured between long edges 12 and 13 of between about 1 and 2 inches and a disengaged flat length measured between short edges 14 and 19 of between about 12 and 20 inches. Each Velcro patch preferably occupies the full height of the holding band, and has a length between about 2 and 4 inches. Once formed, the closed loop may be characterized as having a forwardly disposed portion 20 and rearwardly disposed portion 21.

Tensioning means in the form of elongated elastomeric band 22 engages holding band 11 by penetrative interwoven engagement with slits 23 perpendicularly disposed to long edges 12 and 13 in that part of the holding band which becomes the forwardly disposed portion of said closed loop. The illustrated embodiment of band 22 is provided with two Velcro fastener pairs 34, shown in FIG. 5, which enable the ends of said band to be doubled back and attached at adjustably positionable sites within said fastener pairs to form terminal loops 24. The effective length of band 22 is therefore variable between terminal loops 24 which are freely movable extremities. Each terminal loop 24 engages a jawed-type of releasable fastener 25 of conventional design capable of gripping a fold of fabric such as the shirt 26 of the user.

Figure 5:
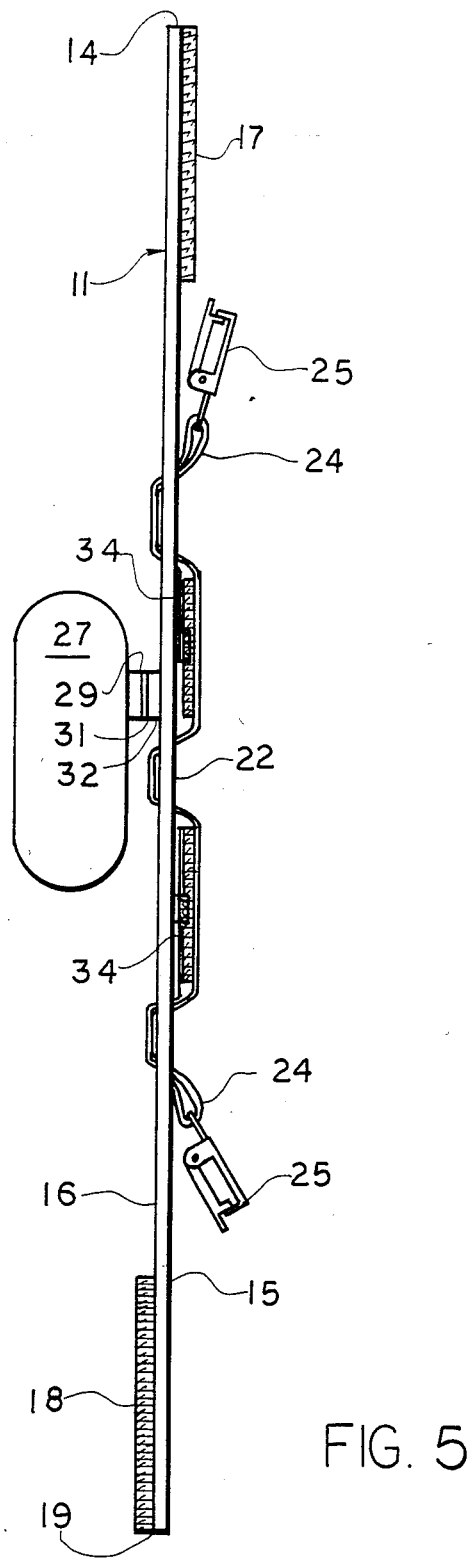
FIG. 5 is a top view of the device of FIG. 4.

Lens protecting means in the form of elongated cuplike cap 27 is attached to upper extremity 28 of elongated flexible tether 29. As best shown in FIG. 5, the lower extremity 30 of said tether is provided with Velcro material 31, and is adapted to engage a coordinatively interactive patch of Velcro material 32 attached to holding band 11. By virtue of the adjustable manner of attachment of tether 29, the position of cap 27 can be altered to fit over the eyepiece lenses 32 of variously sized binoculars. Also, cap 27 may be completely removed from holding band 11, thereby rendering the device useful for holding a camera.

In operation, holding band 11 is drawn tightly around the binoculars or camera, and the Velcro patches 17 and 18 are interengaged to form a snug closed loop embracing the binoculars or camera. The length of tether 29 is adjusted so that cap 27 fits properly over the eyepiece lenses of binoculars. The usual neck strap associated with the binoculars is placed around the wearer's neck to position the binoculars in front of the wearer at waist or chest level. The free extremities 24 of band 22 are tensioned, and fasteners 25 are caused to engage a fabric fold of the wearer's shirt or jacket.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A holder device adapted to hold neckstrap-suspended binoculars or cameras in a non-swinging manner in front of the user comprising:
   (a) an elongated elastomeric holding band having two extremities in opposed relationship with respect to the axis of elongation of said holding band,
   (b) releasable fastener means associated with each extremity of said holding band, thereby facilitating formation of said holding band into a closed loop having a variably sized perimeter and portions which are forwardly and rearwardly disposed with respect to a horizontally disposed plane containing said axis of elongation,
   (c) tensioning means associated with said holding band at a site that becomes the forwardly disposed portion of said closed loop, said tensioning means having two freely movable extremities adapted to apply a tensioning force directed substantially horizontally and rearwardly with respect to said closed loop,
   (d) engaging means associated with each extremity of said tensioning means and adapted to releasably engage the apparel of the user, and
   (e) lens protecting means attached by a flexible tether to said holding band.

2. The holder device of claim 1 wherein said tensioning means is of elongated configuration and elastomeric, having a length which is adjustable by virtue of releasable fastening means which form a loop at each freely movable extremity of said tensioning means.

3. The holder device of claim 2 wherein said holding band is provided with at least one pair of parallel slits perpendicularly disposed to said axis of elongation.

4. The holder device of claim 3 wherein said tensioning means slideably engages said holding band by passage through said paired slits.

5. The holder device of claim 4 wherein said engaging means are engaged by the loops at each freely movable extremity of said tensioning means.

6. The holder device of claim 1 wherein said tether is releasably attached to said holding band.

7. The holder device of claim 5 wherein said engaging means are comprised of jawed clips.

* * * * *